(12) United States Patent
Pasca et al.

(10) Patent No.: US 9,043,197 B1
(45) Date of Patent: May 26, 2015

(54) EXTRACTING INFORMATION FROM UNSTRUCTURED TEXT USING GENERALIZED EXTRACTION PATTERNS

(75) Inventors: Alexandru Marius Pasca, Sunnyvale, CA (US); Dekang Lin, Cupertino, CA (US)

(73) Assignee: Google Inc., Mountain View, CA (US)

( * ) Notice: Subject to any disclaimer, the term of this patent is extended or adjusted under 35 U.S.C. 154(b) by 1903 days.

(21) Appl. No.: 11/774,428

(22) Filed: Jul. 6, 2007

Related U.S. Application Data

(60) Provisional application No. 60/830,808, filed on Jul. 14, 2006.

(51) Int. Cl.
*G06F 17/27* (2006.01)
*G06F 17/21* (2006.01)
*G06F 17/28* (2006.01)

(52) U.S. Cl.
CPC ........ *G06F 17/2785* (2013.01); *G06F 17/2881* (2013.01)

(58) Field of Classification Search
CPC .......................... G06F 17/2881; G06F 17/2785
USPC ....................................... 704/9, 10
See application file for complete search history.

(56) References Cited

U.S. PATENT DOCUMENTS

| | | | | |
|---|---|---|---|---|
| 6,154,737 | A * | 11/2000 | Inaba et al. | 707/696 |
| 6,941,513 | B2 * | 9/2005 | Meystel et al. | 715/256 |
| 8,332,371 | B1 | 12/2012 | Brin | |
| 2001/0044720 | A1 * | 11/2001 | Lee et al. | 704/251 |
| 2002/0107683 | A1 * | 8/2002 | Eisele | 704/2 |
| 2005/0108001 | A1 * | 5/2005 | Aarskog | 704/10 |
| 2005/0125219 | A1 * | 6/2005 | Dymetman et al. | 704/9 |
| 2005/0154580 | A1 * | 7/2005 | Horowitz et al. | 704/9 |
| 2006/0009966 | A1 * | 1/2006 | Johnson et al. | 704/10 |
| 2006/0200478 | A1 * | 9/2006 | Pasztor et al. | 707/100 |
| 2007/0067157 | A1 * | 3/2007 | Kaku et al. | 704/10 |
| 2007/0067289 | A1 * | 3/2007 | Novak | 707/6 |
| 2007/0233458 | A1 * | 10/2007 | Sakao et al. | 704/9 |
| 2008/0021700 | A1 * | 1/2008 | Moitra et al. | 704/9 |
| 2008/0204595 | A1 * | 8/2008 | Rathod et al. | 348/465 |
| 2009/0182547 | A1 * | 7/2009 | Niu et al. | 704/2 |
| 2009/0287476 | A1 * | 11/2009 | Johnson et al. | 704/10 |
| 2010/0082333 | A1 * | 4/2010 | Al-Shammari | 704/10 |
| 2010/0138211 | A1 * | 6/2010 | Shi et al. | 704/3 |

OTHER PUBLICATIONS

M. Califf and R. Mooney, Relational learning of pattern-match rules for information extraction. In: Proc. AAAI-99, Orlando, FL (1999).*
Gentner, D., "Some Interesting Differences Between Verbs and Nouns," *Cognition and Brain Theory* (1981), No. 2, Lawrence Erlbaum Associates, Hillsdale, New Jersey, p. 161-178.

(Continued)

*Primary Examiner* — Richemond Dorvil
*Assistant Examiner* — Michael Ortiz Sanchez
(74) *Attorney, Agent, or Firm* — Fish & Richardson P.C.

(57) ABSTRACT

Methods, systems, and apparatus, including computer program products, for extracting information from unstructured text. Fact pairs are used to extract basic patterns from a body of text. Patterns are generalized by replacing words with classes of similar words. Generalized patterns are used to extract further fact pairs from the body of text. The process can begin with fact pairs, basic patterns, or generalized patterns.

23 Claims, 5 Drawing Sheets

(56) References Cited

OTHER PUBLICATIONS

Hanson, S.J., et al., "Conceptual Clustering, Categorization, and Polymorphy," *Machine Learning* (1988), vol. 3, Kluwer Academic Publishers, The Netherlands, p. 343-372.

Liddy, E.D., et al., "A Natural Language Text Retrieval System with Relevance Feedback," *16th National Online Meeting Proceedings* (1995), Learned Information, Inc., Medford, NJ, p. 259-261.

Liddy, E.D., et al., "An Overview of DR-LINK and Its Approach to Document Filtering," *Human Language Technology, Proceedings of a workshop held at Plainsboro, New Jersey* Mar. 21-24, 1993, Advanced Research Projects Agency, p. 358-362.

Liddy, E.D., et al., "DR-LINK: Document Retrieval Using Linguistic Knowledge," *Human Language Technology, Proceedings of a workshop held at Plainsboro, New Jersey* Mar. 21-24, 1993, Advanced Research Projects Agency, p. 416.

Liddy, E.D., et al., "DR-LINK System: Phase I Summary," *Tipster Text Program, Phase I, Proceedings of a Workshoip held at Fredricksburg, Virginia*, Sep. 19-23, 1993, Advanced Research Projects Agency, p. 93-112.

Liddy, E.D., et al., "Text Categorization for Multiple Users Based on Semantic Features from a Machine-Readable Dictionary," *acm Transactions on Information Systems* (1994), vol. 12, No. 3, Association for Computing Machinery, Inc., New York, NY, p. 278-295.

Paik, W., et al., "Categorizing and Standardizing Proper Nouns for Efficient Information Retrieval," *Acquisition of Lexical Knowledge from Text, Proceedings of a Workshop Sponsored by the Special Interest Group on the Lexicon of the Association for Computational Linguistics*, Jun. 21, 1993, Columbus, OH, Association for Computational Linguistics, p. 154-160.

Paik, W., et al., "Interpretation of Proper Nouns for Information Retrieval," *Acquisition of Lexical Knowledge from Text, Proceedings of a Workshop Sponsored by the Special Interest Group on the Lexicon of the Association for Computational Linguistics*, Jun. 21, 1993, Columbus, OH, Association for Computational Linguistics, p. 309-313.

Salton, G., "Automatic Text Processing, The Transformation, Analysis, and Retrieval of Information by Computer," Addison-Wesley Publishing Company (1989), Table of Contents, p. ix-xiii.

Van Dijk, T.A., "News Analysis, CaseStudies of International and National News in the Press," Lawrence Erlbaum Associates (1988), Hillsdale, NJ, Table of Contents, p. v-vii.

Remy, M. 2002. Wikipedia: The free encyclopedia. *Online Information Review* 26(6):434.

Voorhees, E., and Tice, D. 2000. Building a question-answering test collection. In *Proceedings of the 23rd International Conference on Research and Development in Information Retrieval (SIGIR-00 )*, 200-207.

Brin, S. 1998. Extracting patterns and relations from the world wide web. In *Proceedings of the 6th International Conference on Extending Database Technology (EDBT-98 )*, Workshop on the Web and Databases, 172-183.

Turney, P. 2001. Mining the web for synonyms: PMI-IR vs. LSA on TOEFL. In *Proceedings of the 12th European Conference on Machine Learning (ECML-01 )*, 491-502.

Riloff, E., and Jones, R. 1999. Learning dictionaries for information extraction by multi-level bootstrapping. In *Proceedings of the 16th National Conference on Artificial Intelligence (AAAI-99)*, 474-479.

Riloff, E. 1996. Automatically generating extraction patterns from untagged text. In *Proceedings of the 13th National Conference on Artificial Intelligence (AAAI-96)*, 1044-1049.

Thelen, M., and Riloff, E. 2002. A bootstrapping method for learning semantic lexicons using extraction pattern contexts. In *Proceedings of the Conference on Empirical Methods in Natural Language Processing (EMNLP-02)*, 214-221.

Cafarella, M.; Downey, D.; Soderland, S.; and Etzioni, O. 2005. KnowItNow: Fast, scalable information extraction from the web. In *Proceedings of the Human Language Technology Conference (HLT-EMNLP-05)*, 563-570.

Lin, D. 1998. Automatic retrieval and clustering of similar words. In *Proceedings of the 17th International Conference on Computational Linguistics and the 36th Annual Meeting of the Association for Computational Linguistics (COLING-ACL-98)*, 768-774.

Dean, J., and Ghemawat, S. 2004. MapReduce: Simplified data processing on large clusters. In *Proceedings of the 6th Symposium on Operating Systems Design and Implementation (OSDI-04)*, 137-150.

M. Stevenson and M. Greenwood. 2005. A semantic approach to IE pattern induction. In *Proceedings of the 43rd Annual Meeting of the Association for Computational Linguistics (ACL-05)*, pp. 379-386, Ann Arbor, Michigan.

F. Pereira, N. Tishby, and L. Lee. 1993. Distributional clustering of english words. In *Proceedings oldie 31st Annual Meeting of the Association for Computational Linguistics (ACL-93)*, pp. 183-190, Columbus, Ohio.

T. Brants. 2000. TnT—a statistical part of speech tagger. In *Proceedings of the 6th Conference on Applied Natural Language Processing (ANLP-00)*, pp. 224-231, Seattle, Washington.

L. Lita and J. Carbonell. 2004. Instance-based question answering: A data driven approach. In *Proceedings of the Conference on Empirical Methods in Natural Language Processing (EMNLP-04)*, pp. 396-403, Barcelona, Spain.

D. Hindle. 1990. Noun classification from predicate-argument structures. In *Proceedings of the 28th Annual Meeting of the Association for Computational Linguistics (ACL-90)*, pp. 268-275, Pittsburgh, Pennsylvania.

Cucerzan, S., and Agichtein, E. 2005. Factoid question answering over unstructured and structured content on the web. In *Proceedings of the 14th Text REtrieval Conference (TREC-05)*.

G. Grefenstette. 1994. *Explorations in Automatic Thesaurus Discovery*. Kluwer Academic Publishers, Boston, Massachusetts.

T. Hasegawa, S. Sekine, and R. Grishman. 2004. Discovering relations among named entities from large corpora. In *Proceedings of the 42nd Annual Meeting of the Association for Computational Linguistics (ACL-04)*, pp. 415-422, Barcelona, Spain.

E. Agichtein and L. Gravano. 2000. Snowball: Extracting relations from large plaintext collections. In *Proceedings of the 5th ACM International Conference on Digital Libraries (DL-00)*, pp. 85-94, San Antonio, Texas.

M. Collins and Y. Singer. 1999. Unsupervised models for named entity classification. In *Proceedings of the 1999 Conference on Empirical Methods in Natural Language Processing and Very Large Corpora (EMNLP/VLC-99)*, pp. 189-196, College Park, Maryland.

M. Fleischman, E. Hovy, and A. Echihabi. 2003. Offline strategies for online question answering: Answering questions before they are asked. In *Proceedings of the 41st Annual Meeting of the Association for Computational Linguistics (ACL-03)*, pp. 1-7, Sapporo, Japan.

M. Pasca. 2002. Processing Definition Questions in an Open-Domain Question Answering System. Mining answers from texts and knowledge bases. The British Library—"The world's knowledge," (AAAI-02), pp. 73-78, Dallas, Texas.

M. Pasca. 2002. Answer Finding Guided by Question Semantic Constraints. In *Proceedings of the Fifteenth International Florida Artificial Intelligence Research Society Conference (AAAI-02)*, pp. 67-71, Dallas, Texas.

M. Pasca, D. Lin, J. Bigham, A. Lifchits, and A. Jain. 2006. Organizing and Searching the World Wide Web of Facts—Step One: the One-Million Fact Extraction Challenge, (AAAI-06), pp. 1400-1405.

M. Pasca. 2001. Unveiling Next-Generation Search Technologies: Answer Extraction on the Web. International conference on internet computing; IC' 2001. The British Library—"The world's knowledge," pp. 757-763, Dallas, Texas.

M. Pasca. 2005. Finding Instance Names and Alternative Glosses on the Web: WordNet Reloaded. A. Gelbukh (Ed.): CICLing 2005, LNCS 3406, pp. 280-292, 2005. Springer-Verlag Berlin Heidelberg, Mountain View, CA.

M. Pasca. 2004. Acquisition of Categorized Named Entities for Web Search. CIKM'04, Nov. 8-13, 2004, pp. 137-145, Washington, DC.

M. Pasca. 2003. Question-Driven Semantic Filters for Answer Retrieval. International Journal of Pattern Recognition and Artificial Intelligence, vol. 17, No. 5 (2003) 741-756, World Science Publishing Company, Richardson, Texas.

(56) References Cited

OTHER PUBLICATIONS

M. Pasca and P. Dienes. 2005. Aligning Needles in a Haystack: Paraphrase Acquisition Across the Web. R. Dale et al. (Eds.): IJCNLP 2005, LNAI 3651, pp. 119-130, 2005. Springer-Verlag Berlin Heidelberg, Mountain View, CA.

M. Maybury. 2004. New Directions in Question Answering. AAAI Press and Cambridge, MA: The MIT Press, vol. 31, No. 3, pp. 414-417, Menlo Park, CA.

M. Pasca. 2005. Mining Paraphrases from Self-anchored Web Sentence Fragments. A. Jorge et al. (Eds.): PKDD 2005, pp. 193-204. Springer-Verlag Berlin Heidelberg, Mountain View, CA.

M. Pasca, D. Lin, J. Bigham, A. Lifchits, and A. Jain. 2006. Names and Similarities on the Web: Fact Extraction in the Fast Lane. Coling-ACL 2006: $21^{st}$ International Conference on Computational Linguistics and $44^{th}$ annual meeting of the Association for Computational Linguistics, pp. 809-816.

M. Pasca and S. Harabagiu. 2001. High Performance Question/Answering. SIGIR '01, Sep. 9-12, pp. 366-374. New Orleans, Louisanna.

M. Pasca, D. Lin, J. Bigham, A. Lifchits, and A. Jain. 2006. Organizing and Searching the World Wide Web of Facts—Step One: the One-Million Fact Extraction Challenge. (AAAI-06), pp. 1400-1405.

G. Grefenstette. 1994. "Explorations in Automatic Thesaurus Discovery." Kluwer Academic Publishers, Boston, Massachusetts. Table of Contents only.

A. Kupsc, T. Mitamura, B. Van Durme, E. Nyberg. "Pronominal Anaphora Resolution for Unrestricted Text." Lisbon, Portugal, May 24-30, 2004. LREC.

D. Moldovan, S. Harabagiu, M. Pasca, R. Mihalcea, R. Goodrum, R. G irju, and V. Rus. 1999. "LASSO: A Tool for Surfing the Answer Net." In *Proceedings of the Eighth Text Retrieval Conference (TREC-8)*. Gaithersburg, Maryland.

S. Harabagiu, D. Moldovan, M. Pasca, R. Mihalcea, M. Surdeanu, R. Bunescu, R. Girju, V. Rus, and P. Morarescu. 2000. "FALCON: Boosting Knowledge for Answer Engines." In *Proceedings of Text Retrieval Conference (TREC-9)*. Gaithersburg, Maryland.

S. Harabagiu and M. Pasca. 2000. "Mining Textual Answers with Knowledge-Based Indicators." In *Proceedings of FLAIRS-2000*, May 2000, Orlando, Florida.

I. Ounis and M. Pasca. 1999 IEEE. "The Relief Retrieval System." Proceedings of *1997 IEEE Knowledge and Data Engineering Exchange Workshop*. Grenoble Cedex France.

I. Ounis and M. Pasca. "Modeling Indexing and Retrieving Images Using Conceptual Graphs." University of Grenoble, Grenoble Cedex, France. DEXA 1998: pp. 226-239.

S. Harabagiu, D. Moldovan, M. Pasca, M. Suideanu, R. Mihalcea, R. Girju, V. Rus, F. Lacatusu, P. Morarescu and R. Bunescu. 2001. "Answering complex, list and context questions with LCC's Question-Answering Server." In *Proceedings of the TREC-10 Conference*, Gaithesburg, MD (2001).

S. Harabagiu and M. Pasca. 1999. "Integrating Symbolic and Statistical Methods for Prepositional Phrase Attachment." In *Proceedings of the Twelfth International Florida AI Research Society Conference*. Orlando, Florida May 3-5, 1999. AAAI Press. National Language Processing.

S. Harabagiu, M. Pasca and S. Maiorano. 2001. "A Knowledge-Based Answer Engine for Open-Domain Questions." *International Journal on Artificial Intelligence Tools*, vol. 10, Nos. 1&2, 199-224. World Scientific Publishing Company.

S. Harabagiu, M. Pasca and V. Lacatusu. 2001. "Dialogue Management for Interactive Question Answering." AAAI (www.aaai.org). In *Proceedings of the Fourteenth International Florida Artificial Intelligence Research Society Conference*. Key West, Florida.

S. Harabagiu, M. Pasca and S. Maiorano. 2000. "Experiments with Open-Domain Textual Question Answering." In *Proceedings of the COLING-2000, Association for Computational Linguistics/Morgan Kaufmann*, Aug. 2000.

I. Ounis and M. Pasca. "A Promising Retrieval Algorithm for Systems based on the Conceptual Graphs Formalism." Grenoble Cedex France. IDEAS 1998: pp. 121-130.

I. Ounis and M. Pasca. 1998. "RELIEF: Combining expressiveness and rapidity into a single system." SIGIR '98, pp. 266-274. Melbourne, Australia.

Y. Chiaramella, P. Mulhern, M. Mechkour, I. Ounis, M. Pasca. 1998. "Towards a Fast Precision-Oriented Image Retrieval System." SIGIR '98, Melbourne, Australia. pp. 383.

S. Harabagiu, S. Moaiorano and M. Pasca. 2003. "Open-domain textual question answering techniques." National Language Engineering 9 (3)•: 231-267. Cambridge University Press.

D. Moldovan, M. Pasca, S. Harabagiu and M. Surdeanu. 2003. "Performance Issues and Error Analysis in an Open-Domain Question Answering System." ACM Transactions on Information Systems, vol. 21, No. 2, Apr. 2003, pp. 133-154.

M. Pignataro, M. Pasca, and P. Franchin. 2000. "Thin-Walled Structures." Post-buckling analysis of corrugated panels in the presence of multiple interacting modes. Elsevier Science Ltd. pp. 47-66.

I. Ounis and M. Pasca. 1997 IEEE. "An Extended Inverted File Approach for Information Retrieval." In *Proceedings of the 1997 International Symposium on Database Engineering & Applications*. Grenoble, France.

R. Bunescu and M. Pasca. 2006. "Using Encyclopedic Knowledge for Named Entity Disambiguation." In *Proceedings of the 11th Conference of the European Chapter of the Association for Computational Linguistics (EACL-06)*, Trento, Italy.

S. Harabagiu, D. Moldovan, M. Pasca, R. Mihalcea, M. Surdeanu, R. Bunescu, R. Girju, V. Rus, and P. Morarescu. 2001. "The Role of Lexico-Semantic Feedback in Open-Domain Textual Question-Answering." In *Proceedings of the 39th Annual Meeting of the Association for Computational Linguistics (ACL-2001)*, Jul. 2001, Toulouse, France.

D. Moldovan, S. Harabagiu, M. Pasca, R. Mihalcea, R. Girju, R. Goodrum and V. Rus. 2000. "The Structure and Performance of an Open-Domain Question Answering System." In *Proceedings of the 38th Meeting of the Association for Computational Linguistics (ACL-2000)*, Hong Kong, Oct. 2000.

\* cited by examiner

EXTRACTING INFORMATION FROM UNSTRUCTURED TEXT USING GENERALIZED EXTRACTION PATTERNS

CROSS-REFERENCE TO RELATED APPLICATIONS

This application claims priority to U.S. Provisional Application Ser. No. 60/830,808, filed on Jul. 14, 2006, the contents of which are incorporated herein by reference.

BACKGROUND

This specification relates to the extraction of information from unstructured text.

Due to the developments of web-based computer technology and its ever increasing popularity, more and more people use search engines to locate information on the World Wide Web. Commonly, information is presented using web pages that include links or pointers to other web pages.

Developments have been made to leverage extraction systems to gather information from documents and use that information to answer questions directly. For example, systems have been described that can receive a set of seed facts and generate patterns by applying facts to a collection of sentences.

As described, seed facts are a pair of phrases that relate a subject phrase to an information phrase. Patterns include the words of the sentence broken into three parts; a prefix portion, an infix portion and a postfix portion. The phrases of the facts are used to separate a sentence into the three parts. The three part patterns are used to extract additional facts, and the new extracted facts are used to generate additional patterns. Using hundreds of thousands of iterations, this unsupervised iterative process of fact finding and pattern generation can continue to build up a collection of facts for question answering.

SUMMARY

In general, one aspect of the subject matter described in this specification can be embodied in methods that include the actions of extracting a basic pattern from a first sentence in a collection of sentences that matches a first fact pair in a set of fact pairs, the first fact pair including a first and a second fact phrase, the first and the second fact phrases each being found separately in the sentence, the basic pattern including one or more phrases, each phrase of the basic pattern including one or more sequential terms from the sentence; generating a generalized pattern from the basic pattern, the generalized pattern having a class in place of a term in the basic pattern; extracting a new fact pair from a second sentence in the collection that matches the generalized pattern; and adding the new fact pair to the set of fact pairs. Other embodiments of this aspect include corresponding systems, apparatus, and computer program products.

These and other embodiments can optionally include one or more of the following features. The fact pair includes of the first fact phrase and the fact second phrase; and the basic pattern includes a prefix phrase, an infix phrase, and a postfix phrase, the prefix phrase being a part of the sentence appearing before the first fact phrase in the sentence, the infix phrase being the part of the sentence found between the first fact phrase and the second fact phrase in the sentence, and the postfix phrase being a part of the sentence appearing after the second fact phrase in the sentence. The new fact pair has a first new fact phrase and a second new fact phrase, the first new fact phrase appearing in the second sentence between a prefix phrase and an infix phrase of the generalized pattern, the second new fact phrase appearing in the second sentence between the infix phrase and a postfix phrase of the generalized pattern. The class is a class of distributionally similar words and the term is a word in the class; and the class is represented in the generalized pattern by a class identifier that identifies the class. The basic pattern has a numerical digit and the generalized pattern has a digit marker in place of the numerical digit. The fact pair consists of the first phrase and the second phrase; the basic pattern consists of an infix phrase, the infix phrase being the part of the first sentence found between the first fact phrase and the second fact phrase in the first sentence. Each phrase of a fact pair has one or more words. Each phrase of the basic pattern has one or more words. Each word is a unit of text demarcated by white space or punctuation. The actions further include initializing the set of facts with one or more seed facts. The actions further include extracting one or more seed facts from the collection of sentences using one or more seed patterns, the seed patterns including basic patterns, generalized patterns, or both; and initializing the set of facts with the one or more seed facts. The collection of sentences includes sentences extracted from a large corpus of documents, the documents including text and non-text material.

In general, another aspect of the subject matter described in this specification can be embodied in methods that include the actions of extracting a basic infix-only pattern from a first sentence in a body of text, the first sentence matching a seed fact pair in a set of seed fact pairs; generating a generalized infix-only pattern from the basic infix-only pattern, the generalized infix-only pattern being derived from the basic infix-only pattern by substituting for at least one sentence term in the basic infix-only pattern a distributionally similar class, the sentence term belonging to the distributionally similar class; and extracting a candidate fact pair from a second sentence in the body of text, the second sentence matching the generalized infix-only pattern. Other embodiments of this aspect include corresponding systems, apparatus, and computer program products.

These and other embodiments can optionally include one or more of the following features. The seed fact pair includes a first fact phrase and a second fact phrase; and the basic infix-only pattern is an infix phrase that includes all sentence terms in the first sentence between an occurrence of the first fact phrase and an occurrence of the second fact phrase in the first sentence. Each seed fact pair in the set of seed fact pairs includes a pair of fact phrases; and each phrase of the pair of fact phrases includes one or more sentence terms. Extracting a candidate fact pair includes tagging the seed fact pair with part-of-speech tags, the seed fact pair including a first phrase and a second phrase, each phrase including a sequence of words, each word being tagged with a part-of-speech tag; generating a first sequence of part-of-speech tags for the first phrase of the seed fact pair and a second sequence of part-of-speech tags for the second phrase of the seed fact pair; beginning with a word adjacent to a first end of the infix-only pattern and proceeding away from the pattern in the sentence, adding a word from the sentence to a first phrase for each tag in the first sequence, the first phrase being the portion of the sentence between the last word added and the pattern, each word added to the phrase having a part of speech that matches the part of speech of the corresponding tag in the first sequence; and beginning with a word adjacent to a second end of the infix-only pattern and proceeding away from the pattern in the sentence, adding a word from the sentence to a second phrase for each tag in the second sequence, the second phrase being the portion of the sentence between the last word added and the pattern, each word added to the phrase having a part of speech that matches the part of speech of the corresponding tag in the second sequence; wherein the candidate fact pair includes the first phrase and the second phrase.

In general, another aspect of the subject matter described in this specification can be embodied in methods that include the actions of extracting basic infix-only patterns from a plurality of sentences, each of the sentences matching at least one seed fact pair in a set of seed fact pairs; generating generalized infix-only patterns from the basic infix-only patterns, each generalized infix-only pattern being derived from a basic infix-only pattern by substituting for at least one sentence term in the basic infix-only pattern a corresponding distributionally similar class, the corresponding distributionally similar class having as a member the sentence term for which the class is substituted in generating a generalized infix-only pattern; extracting new fact pairs from sentences in the body of text that match at least one of the generalized infix-only patterns; and adding the new fact pairs to a set of candidate fact pairs. Other embodiments of this aspect include corresponding systems, apparatus, and computer program products.

These and other embodiments can optionally include one or more of the following features. The actions further include calculating a rank for each candidate fact pair based on a measure of similarity between the candidate fact pair and one or more of the seed fact pairs; and adding all candidate fact pairs having a rank above a threshold to the set of seed fact pairs. The actions further include using a seed set of basic or generalized infix-only patterns to generate the set of seed fact pairs before extracting any basic infix-only patterns from the plurality of sentences.

In general, another aspect of the subject matter described in this specification can be embodied in methods that include the actions of receiving one or more seed fact pairs, each seed fact pair including a first phrase and a second phrase; receiving a set of one or more candidate fact pairs, each candidate fact pair including a first phrase and a second phrase; calculating a similarity score for each candidate fact pair with respect to at least one seed fact pair; and calculating a rank score for each candidate fact pair based on calculated similarity scores for each candidate fact pair. Other embodiments of this aspect include corresponding systems, apparatus, and computer program products.

These and other embodiments can optionally include one or more of the following features. The candidate fact pairs include pairs derived from documents having respective associated document quality scores; and the actions further include using the respective associated document quality scores in calculating a rank score for each candidate fact pair. The rank score for each candidate fact pair is determined solely by the calculated similarity scores for each candidate fact pair; and the actions further include adding all candidate fact pairs having a rank score above a threshold rank score to the set of seed fact pairs. Calculating the similarity score for a candidate fact pair with respect to a seed fact pair includes calculating a similarity score for each phrase of the candidate fact pair with respect to the corresponding phrase of the seed fact pair. Calculating the similarity score for a phrase of a candidate fact pair with respect to a phrase of a seed fact pair includes calculating a similarity score for a sentence term at each extremity of the phrase of the candidate fact pair with respect to a sentence term at the corresponding position in the phrase of the seed fact pair. The actions also include increasing the similarity score for a candidate fact pair if the candidate fact pair is similar to more than one seed fact pair, a candidate fact pair being similar to a seed fact pair if the similarity score for the candidate fact pair with respect to the seed fact pair exceeds a threshold score. The actions also include adding all candidate fact pairs having a rank score above a threshold rank score to the set of seed fact pairs.

In general, another aspect of the subject matter described in this specification can be embodied in methods that include the actions of calculating a similarity score for one or more fact pairs in a first set with respect to each of one or more fact pairs in a second set; and ranking the fact pairs in the first set according to their similarity scores. Other embodiments of this aspect include corresponding systems, apparatus, and computer program products.

These and other embodiments can optionally include one or more of the following features. The actions further include adding fact pairs in the first set having a ranking above a threshold to the second set to produce an updated second set; obtaining additional fact pairs; calculating a similarity score for the additional fact pairs with respect to each of one or more fact pairs in the updated second set; and ranking the additional fact pairs according to their similarity scores.

In general, another aspect of the subject matter described in this specification can be embodied in methods that include the actions of receiving one or more seed fact pairs, each seed fact pair including a first phrase and a second phrase; receiving a set of one or more candidate fact pairs, each candidate fact pair including a first phrase and a second phrase; calculating a similarity score for each candidate fact pair with respect to at least one seed fact pair; and calculating a rank score for each candidate fact pair based on all calculated similarity scores for each candidate fact pair and a phrase completeness score for each phrase of each candidate fact. Other embodiments of this aspect include corresponding systems, apparatus, and computer program products.

These and other embodiments can optionally include one or more of the following features. The candidate fact pairs include pairs derived from documents having respective associated document quality scores; and the actions further include using the respective associated document quality scores in calculating a rank score for each candidate fact pair.

Particular embodiments of the subject matter described in this specification can be implemented to realize one or more of the following advantages. Good to excellent sentence coverage can be achieved in a data efficient manner. Large quantities of accurate candidate facts can be generated using a reasonable number of iterations. For example, one implementation generated candidate facts at a growth rate of 100,000:1 per iteration, i.e. 100,000 new useful candidate facts for each fact received. Noisy text documents, such as web pages, can be used avoiding the reliance on clean text collections. Text can be processed successfully without using named entity recognition or shallow syntactic parsing which can impose constraints on the categories of applicable facts or the computational cost of processing the text, respectively.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
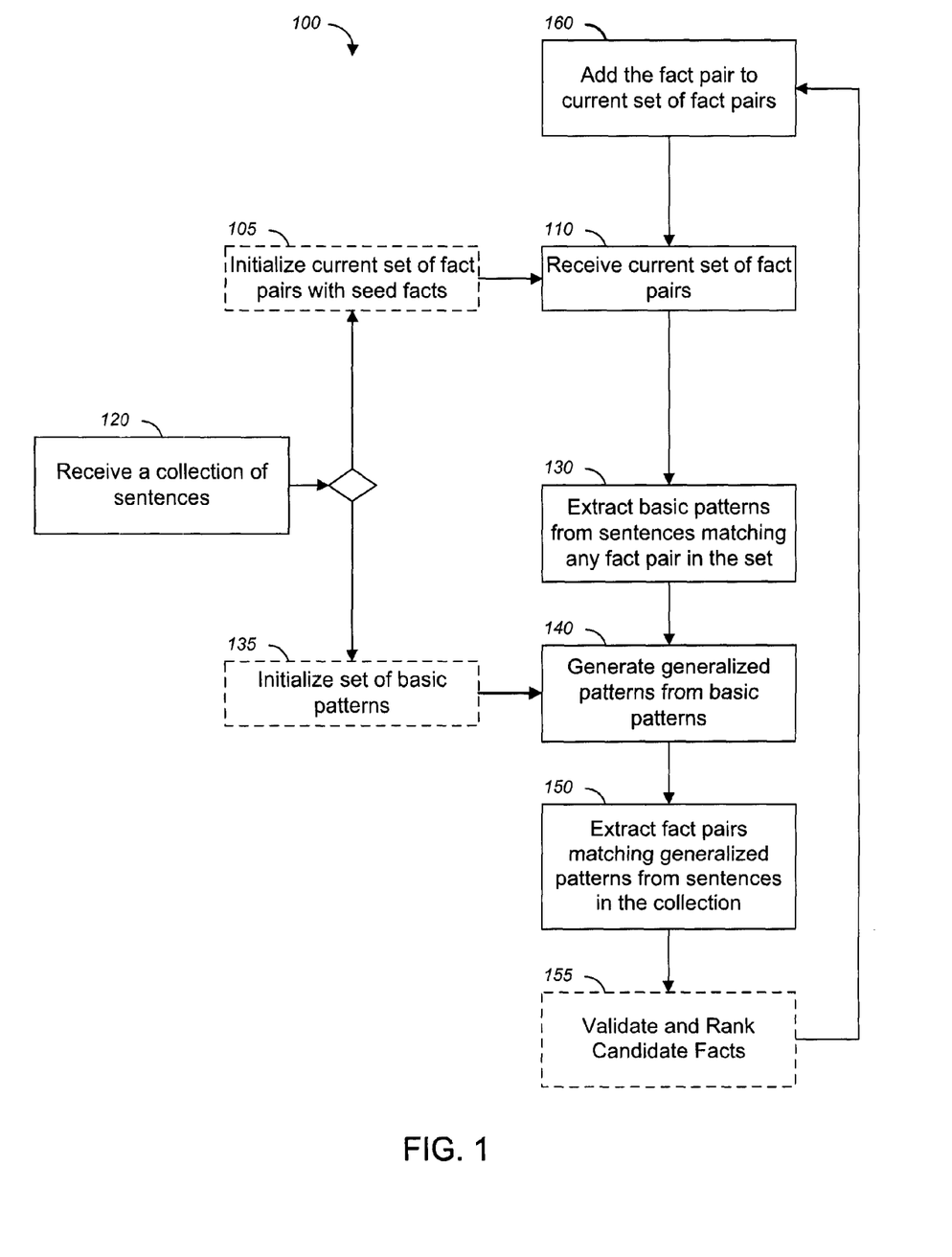
FIG. 1 is a flow chart illustrating a general method for the creation and use of generalized extraction patterns for information extraction from unstructured text.

FIG. 1 is a flow chart illustrating a general method 100 for the creation and use of generalized extraction patterns for information extraction from unstructured text.

The method 100 will be described in reference to a data processing system that implements the method 100 to extract information in the form of fact pairs from unstructured text. The system uses a set of fact pairs. The system can optionally be initialized with a set of seed facts (step 105). The system can also be optionally initialized with a set of basic patterns (step 135). Facts are extracted from patterns and subsequent patterns are generated from extracted facts. The system receives (step 110) a set of fact pairs that it uses to extract additional facts by executing at least one iteration of the method 100.

A fact pair includes two phrases, a fact subject, such as "Albert Einstein", and some piece of information associated with the subject, such as "1879", which, in this case, would be the subject's date of birth.

The system also operates on a collection of sentences. The system receives (step 120) a collection of sentences. The sentences may or may not include sentences containing fact pairs.

Sources of sentences can include electronic documents. An electronic document (which for brevity will simply be referred to as a document) does not necessarily correspond to a file. A document may be stored in a portion of a file that holds other documents, in a single file dedicated to the document in question, or in multiple coordinated files. Documents can be stored locally or they can be stored remotely and accessed over a network. Documents can be, for example, word processing documents, spreadsheet documents, presentation documents, or PDF (Portable Document Format) documents.

One useful source of documents is web pages from a variety of websites. In some implementations, the websites can be referenced as part of a web snapshot taken by a search engine, such as the Google™ search engine, developed by Google Inc. of Mountain View, Calif. In cases where web pages are used, the pages can be cleaned of tags, e.g., HTML (Hypertext Markup Language) tags, broken into substrings, split into sentences and tagged with parts of speech.

The lexical unit that is used for part of speech tagging is a word, that is, each word in the sentence is assigned its own part of speech tag. A suitable part of speech tagger is the TnT tagger described in Brants, T., TnT—a statistical part of speech tagger, *Proceedings of the Conference of Applied Natural Language Processing* (ANLP-00), 224-231 (2000).

The system extracts (step 130) basic patterns from the sentences that match any of the fact pairs. A sentence matches a fact pair if both phrases of the fact pair occur without overlap in the sentence, with something in between them.

The term "basic" is used to describe a pattern when the parts of the pattern are all actual text drawn from the sentence from which the pattern was extracted. This is in contrast to a generalized pattern, which will be described below. The extracted patterns can have a number of different structures.

The immediately following portion of this specification will describe the method 100 in terms of multi-part patterns, in particular, in terms of patterns having a three-part or prefix-infix-postfix structure. Later in this specification, refinements of the method 100 and further techniques that are of particular relevance to infix-only patterns will be described.

A basic pattern is extracted from a sentence using the phrases of a fact pair as delimiters. The part of the sentence between the fact phrases are considered to be in the infix portion of the basic pattern, while all or a portion of the sentence to left or right, respectively, of the fact phrases are the prefix and postfix of the basic pattern, respectively. (In this specification, for the sake of brevity and convenience, patterns and phrases are described as they would occur in a left-to-right writing system. For writing systems oriented differently, the relative positions would differ accordingly.) So that there will be at least a portion of the sentence to the left and right of the fact phrases, each sentence is deemed to begin with a start of sentence token (e.g., "StartOfSent" in Table 1, below) and end with an end of sentence token (e.g., "EndOfSent" in Table 1, below).

The system generates (step 140) generalized patterns from both the basic patterns the system extracted and the basic patterns that the system was initialized with, if any. A basic pattern is generalized by replacing words in the basic pattern with word classes, so that each word is replaced with a word class of which the word is a member. A basic pattern can optionally also be generalized by replacing digits with a marker (e.g., "0") such that two numerical values with the same number of digits will match during pattern matching, even if they were originally different values. The system leaves punctuation alone when constructing generalized patterns. As the basic patterns are generalized, duplicates may arise and be combined; the set of generalized patterns will generally be smaller than the set of basic patterns.

The generalized patterns are used to extract (step 150) fact pairs matching the generalized patterns from the sentences in the collection. In some implementations, the first phrase of the fact pair is the text in a sentence between the prefix and infix portions of a generalized pattern, and the second phrase of the fact pair is the text in the sentence between the infix and postfix portions of the generalized pattern.

The system can optionally validate and rank (step 155) candidate facts adding accepted candidate facts that exceed a ranking threshold to the current set of fact pairs. Validation and ranking are described in more detail below.

The system can add (step 160) the extracted fact pairs to a current set of fact pairs and use the newly extracted fact pairs to generate patterns and extract additional fact pairs from the sentences as described above. In some implementations, the extracted fact pairs are automatically evaluated to test coverage against predefined or previously known facts.

The system can continue in an iterative manner until a predetermined time has elapsed, until a predetermined number of fact pairs have been extracted, or some other impetus to discontinue processing has been achieved (e.g., user intervention). The system can use fact pairs generated by previous executions of the method as new seed fact pairs. The method 100 does not need to be run continuously and can be stopped and started without consequence. In some implementations, the results of the method are evaluated, either manually or automatically, to test fact validity or track fact divergence that might result, for example, from the introduction of a faulty or misleading pattern.

Accurately generated fact pairs can be used in a variety of ways; for example, a search engine with access to an arbitrarily large set of facts can answer fact-seeking queries directly (e.g., providing an answer of "1940" to the query "When was John Lennon born") rather than providing pointers or links to documents that may contain answers.

Figure 2:
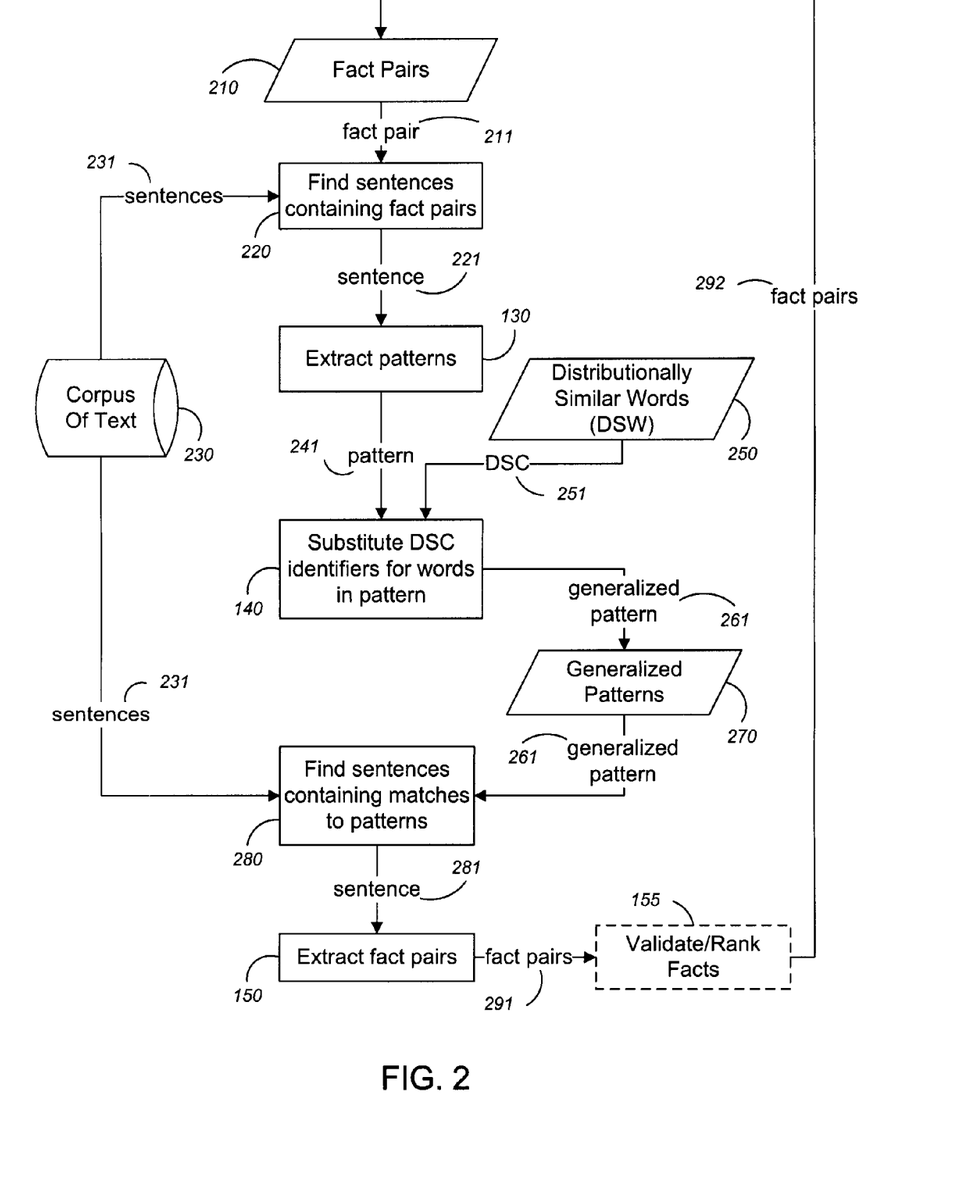
FIG. 2 shows an alternative representation of the method illustrated in FIG. 1.

FIG. 2 shows an alternative representation of the method illustrated in FIG. 1.

As described previously, fact pairs 210 are matched against sentences 231 from a collection of sentences 230 to extract basic patterns. From the basic patterns generalized patterns are generated, and those generalized patterns are applied to the sentences to generate additional fact pairs.

A fact pair 211 represents a fact as a pair of phrases that are in a "hidden" relation, for example, (Vincenzo Bellini, 1801) for Person-BornIn-Year facts, (Athens, Greece) for City-CapitolOf-Country facts, or (Portuguese, Brazil) for Language-SpokenIn-Country facts.

Each fact pair 211 can be used to search sentences 231 to find (step 220) sentences containing the fact pairs. Finding sentences containing fact pairs can be done in parallel in a conventional manner for processing large data sets, such as the approach described in Dean, J., and Ghemawat, S., MapReduce: Simplified data processing on large clusters. *Proceedings of the 6th Symposium on Operating Systems Design and Implementation* (OSDI-04), 137-150 (2004). The sentences 231 originate from a collection of sentences 230, which can be created as described above.

The matching of fact pairs 210 in sentences 231 can be accomplished using a modified trie. A trie, also known as a prefix tree, stores strings in the nodes of the trie where there is one node for each common string prefix and the leaves of the tree store an integer value that specifies uniquely a word that can be accessed through an associative array, or look-up table. The modified trie can be loaded with new fact phrases (candidate facts) or the prefix, infix, and postfix portions of a pattern where each node is a string and the leaves specify an integer value that uniquely specifies a pattern. Nodes can also be classes of words generated by the system for the purposes of matching generalized patterns.

As described previously, the system can extract (step 130) a basic pattern from each sentence 221 that contains a fact pair 211. The occurrence of the two phrases of a fact pair 211 within a sentence 221 is used to define a basic contextual extraction pattern 241, denoted as a triple. A triple contains a prefix portion, an infix portion, and a postfix portion of the sentence 221. The basic pattern 241 is extracted from the sentence 221 to form the prefix-infix-postfix triple.

The previously mentioned trie can also be used to extract the basic patterns from one or more sentence 221. Initially, both phrases of each fact pair 211 are loaded in the trie. Each sentence 221 is then matched onto the trie, resulting in a new basic pattern if both parts of the same fact 211 can be successfully matched. Matching is accomplished by traversing the trie and verifying that the traversal ends in a leaf and not a node of the trie.

The prefix and postfix portions are contiguous sequences of a fixed number of terms, situated to the immediate left of the first fact phrase (e.g., to the left of "Athens"), and to the immediate right of the second fact phrase (e.g., to the right of "Greece") respectively. The infix portion contains the terms between the two matched fact phrases (e.g., between "Athens" and "Greece").

For example, the occurrence of the fact pair, (Athens, Greece), in the sentence "The proposed trip will take students to Athens, the capitol of Greece and home to 40% of the Greek population." produces a pattern with a prefix portion [ . . . take students to], an infix portion [, the capital of] and the postfix portion [and home to . . . ].

As mentioned above, generalized patterns are generated from basic patterns by replacing words in the basic patterns with word classes. The classes can be represented in the generalized pattern by a class identifier.

The system can use a set of distributionally similar words (DSWs) 250 to compute a set of distributionally similar classes (DSCs). The identification of distributionally similar words is described in Lin, D., Automatic retrieval and clustering of similar words. *Proceedings of the 18th International Conference of Computation Linguistics and the 36th Annual Meeting for Computational Linguistics* (COLING-ACL-98), 768-774 (1998).

In one implementation, the set of DSWs 250 were extracted and classified from approximately 50 million news articles indexed by the Google search engine over a period of three years. The DSWs 250 are stored in pairs, each pair having a similarity score that defines how closely similar the words pairs are.

The classes can be calculated as the system executes the method 100. The system uses the entire set of basic patterns and the large set of DSWs 250 to determine the class an extracted word is associated with. The highest similarity score of the newly extracted words is used to make the determination of which class the words belong to. For example, a collection of cities (e.g., "Paris", "Rome", and "Berlin") would be put into a class that encompasses the capitals of Europe, while another set of basic patterns would group "Paris" into a class that encompasses the cities of France along with, for example, "Nice", and "Dijon". The system can also check to ensure that each word is included in only one word class 251.

Each DSC 251 can be substituted 260 for a word in the basic extracted pattern 241 to form a generalized pattern 261. This is illustrated in Table 1, below:

TABLE 1

| Generalized Pattern Number | Prefix | Infix | Postfix |
| --- | --- | --- | --- |
| 1 | CL3 00th : | 's Birthday ( | ) . EndOfSent |
| 2 | StartOfSent | CL4 CL8 CL22 CL26 born | In CL17 , |
| 3 | Memorial CL47 in | ( b. CL3 0 , | , d. CL3 |
| 4 | Among CL6 . . . | CL4 born on 00 CL3 | in CL10 , |
| 5 | CL8 child : | CL4 born 00 CL3 | in Lewisburg , |
| 6 | CL4 written by | who CL4 born CL3 00, | , in Oak |

CL3 = {March, October, April, May, August, February, July, November, . . . }
CL4 = {is, was, has, does, could}
CL6 = {You, Lawmakers, Everyone, Nobody, Participants, . . . }
CL8 = {a, the, an , each, such, another, this, three, four, its, most, . . . }
CL10 = {Pennsylvania, Denver, Oxford, Marquette, Hartford, . . . }
CL17 = {Tipperary, Rennes, Piacenza, Osasuna, Dublin, Crewe, . . . }
CL22 = {Brazilian, Chinese, Japanese, Italian, Pakistani, Latin, . . . }
CL26 = {entrepreneur, illustrator, artist, writer, sculptor, chief, . . . }
. . .
CL47 = {Tribute, Homage}
. . .

The table illustrates a small set of basic patterns that have been replaced by the DSCs CL3, CL4, CL6, CL8, CL10, CL17, CL22, CL 26, and CL 47 to create generalized patterns 1-6.

To compute the generalized classes, as illustrated by the above table, one implementation of the system computes a similarity score between pairs of basic patterns as the geometric mean, defined as:

$$(a \times b \times c)^{1/3},$$

where a, b, and c are the similarity scores computed by comparing the prefix, infix, and postfix patterns, respectively. The similarity scores for two prefixes being compared combine (e.g., sum) the individual pairwise similarity scores of the two words appearing in the same location of a pattern. That is, for the rightmost word of the prefix, then for the word to the left of that, until all words are considered, a score for each word in a pattern is computed and combined with the score of the other words in the pattern. Infix patterns can be of varying length. Prefix and postfix patterns in one implementation are set to some fixed length with "StartOfSent" or "EndOfSent" padding, if necessary, to simplify pairing of words.

This results in a graph whose vertices are input patterns, and edges are similarity scores.

The system clusters the patterns in the graph. After clustering, the system has a set of clusters each containing one or more patterns. One suitable clustering method is group-average agglomerative clustering, e.g., the method described in Voorhees, E., Implementing agglomerative hierarchic clustering algorithms for use in document retrieval, *Information Processing and Management*. Vol. 22. 465-476 (1986).

Each cluster that contains one or more patterns is converted into a single generalized pattern. In the conversion, each word that was found to be similar to one or more words at the same position in the pattern (e.g., the second to last word of the prefix) is replaced with the set of all such words. For example, if the infixes of three patterns are "was born in Paris in", "was born in Berlin in", and "was born in London in" and the three patterns end up in the same cluster because (Paris, Berlin), (Paris, London) and (Berlin, London) are individually similar to each other, then the infix of the resulting generalized pattern is "was born in CL19 in", where CL19={Paris, Berlin, London}.

Word classes are further expanded by including other words that are strongly similar to the existing group of words in each class. The system sums the individual similarity scores between new words (e.g., similar to words from classes) and words that already exist in the classes, respectively. For example, if the class contains "Paris" and "Berlin", and "Paris" is similar to "Rome" with similarity 0.45, and "Berlin" is similar to "Rome" with similarity 0.6, then the score of the new word "Rome" is 1.05. A new word is added by the system to the existing class of words if its addition-based score is higher than a threshold (e.g., higher than a certain percentage of the number of words in the class before any new word is added to the class). In our example, this may result in CL19 being extended to, CL19 {Paris, Berlin, London, Rome, Madrid, Athens}.

A word is allowed to appear in at most one word class. The system also ensures that all occurrences of a word from a word class are replaced by the class in all patterns, for example by being replaced with an appropriate label. In one implementation, the system scans all generalized patterns to make sure that all occurrences of a word are replaced with the appropriate class label. In the example, if "Paris" appears somewhere in some pattern prefix and was not involved in any conversion during generalization, it is still replaced with CL19.

Generalized patterns can have significantly higher coverage than the basic patterns from which they were created. For example, the second generalized pattern in the above table includes the DSCs CL4, CL8, CL22, CL26, and CL17, which contain 5, 24, 87, 83, and 322 words respectively. After exhaustive enumeration of the elements in its word classes, the second generalized pattern alone would be equivalent to 5×24×87×83×322=279,019,400 basic patterns. Even after discounting the basic patterns whose infixes are unlikely or grammatically incorrect sequences of words (e.g., "does three Brazilian sculptor"), a generalized pattern 261 still has orders of magnitude greater coverage than a basic pattern 241 alone.

Generalized patterns are ranked to improve the likelihood that the patterns used will produce quality facts. Patterns are ranked higher if they include words that are indicative of the relation being mined. For example the use of the word "born" in a pattern is indicative of Person-BornIn-Year facts. Word indications are derived from the seed set. For example, if the seed set encompasses Person-BornIn-Year facts, then the system will more highly rank patterns that include the word "born."

In each iteration of the method 100, the ranking of the patterns is a two-pass process. The first pass computes the normalized frequencies of all words excluding stopwords (e.g., "a", "of", "the"), which provide little or no meaning by themselves. Each frequency is normalized over the sum of all frequencies for all words of the patterns excluding stopwords. The first pass computation applies separately to the prefix, infix, and postfix portions of the patterns.

In the second pass, the rank of each generalized extraction pattern is determined by the word with the highest frequency score in the prefix, the words with the highest frequency infix, and the words with the highest frequency postfix, as computed in the first pass. The second pass score is adjusted for the relative distance of the word to the start and end of the infix portion of the pattern.

Using a generalized pattern 261 and the sentences 231 from the collection 230, the system executing method 100 can find (step 280) sentences containing matches to the generalized pattern 261. Each sentence 281 that is matched with the generalized pattern is analyzed and additional candidate fact pairs 291 are extracted (step 290) from the sentence 281. A trie can again be used to in a similar fashion as described above, where triples are matched onto sentences to extract the candidate fact pair. In some implementations, the candidate facts are filtered by removing candidate facts that are dissimilar to the seed facts.

The new candidate fact pairs 291 are then added to the original set of fact pairs 210 in an iterative fashion as the system continues to extract fact pairs 210 from the collection of sentences until some termination condition is reached. Fact pairs that are used in previous iterations of the method to find candidate facts are stored for fact retrieval, but, in some implementations, are ignored as an optimization in subsequent iterations of generating candidate facts.

The large quantity of accurate facts generated by the system enable the pursuit of new search paradigms, for example, the processing of database-like queries and alternate methods of presenting search results The stored facts are retrieved by a search engine when a user enters an appropriate query matching another phrase of a stored fact. For example, "Who was born in 1940" would return a list of individuals, including John Lennon, whose birth year matched the phrase "1940".

In some implementations, it is advantageous to use only the infix portion of the extracted patterns. The use of infix-only patterns aggressively generates additional candidate facts by ignoring constraints imposed by the prefix and postfix patterns.

However, because the prefix-infix-postfix patterns are more selective, they require fewer computations to produce quality facts. For example, optional steps described later in the specifications (e.g., validating and ranking extracted patterns or candidate facts) are more strictly enforced in infix-only implementations. The immediately following portion of this specification describes the generation and use of infix-only patterns by the method 100.

In the absence of the prefix and postfix portions, the outer boundaries of the fact within a sentence 231 are computed separately for the beginning of the first, or left, phrase and the end of the second, or right, phrase of the candidate fact.

The computation relies on the part-of-speech tags of the current seed set. Starting from the right extremity of the infix portion, the system collects a growing sequence of terms whose part-of-speech tags are $[P_1+P_2+\ldots P_n+]$, where the notation $P_i+$ represents one or more consecutive occurrences of the part-of-speech tag $P_i$.

The sequence $[P_1\ P_2 \ldots P_n]$ must match exactly the complete sequence of part-of-speech tags from the right side of one of the seed facts. The point where the sequence cannot be grown defines the boundary of the fact. A similar procedure is applied backwards from the left extremity of the infix pattern. An infix-only pattern produces a candidate fact from the sentence if an acceptable sequence is found to the left and the right of the infix portion.

Figure 3:
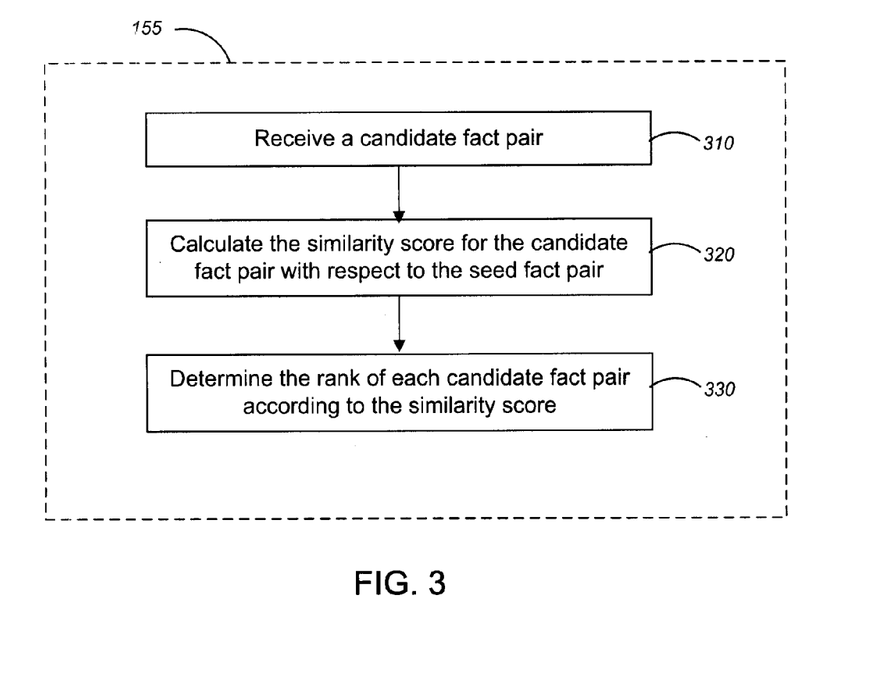
FIG. 3 is a flow chart illustrating validation and ranking of a candidate fact.

FIG. 3 is a flow chart illustrating validation and ranking of a candidate fact.

As described previously, the system can optionally validate and rank candidate facts (step 155). The system receives (step 310) a candidate fact pair and uses the set of seed facts to calculate (step 320) a similarity score. The computation of the similarity scores is used to assess the quality of one or more candidate facts.

A candidate fact is considered similar to the seed set if both the candidate fact's phrases are similar to the corresponding phrases from any of the seed facts. For example, consider a candidate fact phrase "Richard Steele" and two seed facts phrases "John Lennon" and "Robert Foster" from a seed set. The first word "Richard" from the phrase "Richard Steele" is similar to the first word "John" from the phrase "John Lennon". The last word "Steele" from the phrase "Richard Steele" is similar to the last word "Foster" from the phrase "Robert Foster". Therefore, "Richard Steele" is similar to the seed facts. Similarity score calculations are described in more detail in reference to FIG. 4.

The system uses each calculated similarity score to determine (step 330) a rank of the candidate fact pair. The rank of a candidate fact is used to filter facts. Candidate facts that exceed a ranking threshold are added to the set of facts. Only candidate facts that exceed the ranking threshold are added to the seed set. The system maintains a list of candidate facts ranked in decreasing order of their score. There is also a ranking threshold N, such that when the system adds newly extracted facts, only the top N ranked facts are added to the seed set. In one implementation using Person-BornIn-Year facts, N was assigned a value of 33%. That is, only the top third of the candidate facts are added to the seed set. Other implementations can use different values for N. Ranking is described in more detail in reference to FIG. 5.

Figure 4:
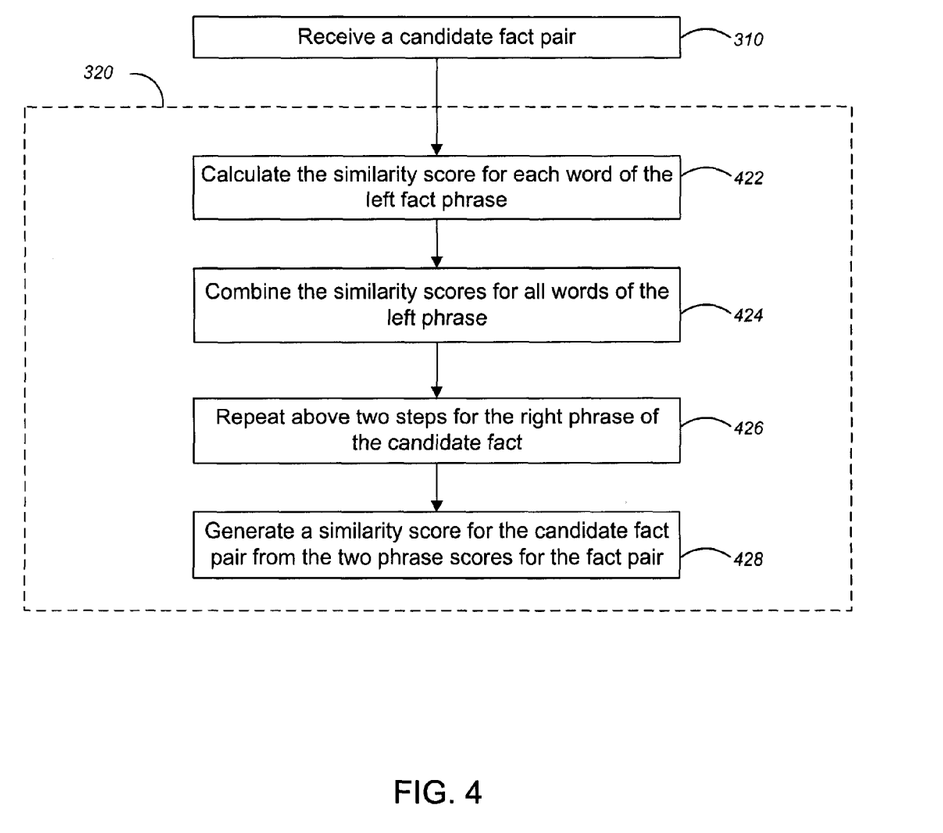
FIG. 4 is a flow chart illustrating calculation of similarity scores.

FIG. 4 is a flow chart illustrating calculation of similarity scores.

As described above, the system receives (step 310) a candidate fact and uses the set of seed facts to calculate (step 320) a similarity score for the candidate fact. The calculation can happen concurrently. The similarity score for a candidate fact is calculated by combining the phrase scores for each phrase of the fact. Each phrase score is calculated by adding together the similarity scores for each word in the phrase. The similarity score for each word is determined by referring to the table of distributionally similar words 250. The system calculates (step 422) the similarity score of a phrase containing N words as $$C_1 + \Sigma \log(1+\text{Sim}_i)$$

if the extremity word scores $\text{Sim}_1$ and $\text{Sim}_N$ are greater than zero. Otherwise, the similarity score is calculated as $C_2$ if $\text{Sim}_1$ and $\text{Sim}_N$ are not greater than zero.

The previously described calculation uses a logarithmic computation, and as such, cannot: use zero as a default similarity score (e.g., $C_2$). For a phrase of a candidate fact to be assigned a non-default similarity score, the words of a fact phrase at the candidate fact's extremities must be similar to one or more words situated at the same positions in the seed fact phrase.

$\text{Sim}_i$ is the similarity value of the component word at position i, where i is in the range $[1 \ldots N]$, in the candidate fact phrase. $C_1$ and $C_2$ are scaling constants such that $C_2$ is much smaller than $C_1$. $C_2$ is defined such that all similarity scores remain greater than (or equal to) zero and all words whose similarity score is lower than $C_2$ can be considered to be non-similar. The similarity score of a candidate fact combines (step 424) individual word-to-word similarity scores for the left side and then for the right side of a candidate fact. The system can repeat (step 426) the word-to-word similarity score calculation (step 422) and the word to word aggregation (step 424) on the right phrase as well. This allows the system to generate (step 428) a similarity score for the candidate fact pair by combining the two individual phrase scores of the candidate fact.

The similarity score of a component word $\text{Sim}_i$ is higher if the computed word-to-word similarity scores, relatively to words at the same position i in the seeds, are higher. The similarity score of $\text{Sim}_i$ is also higher if the component word is similar to words from more than one seed fact.

Figure 5:
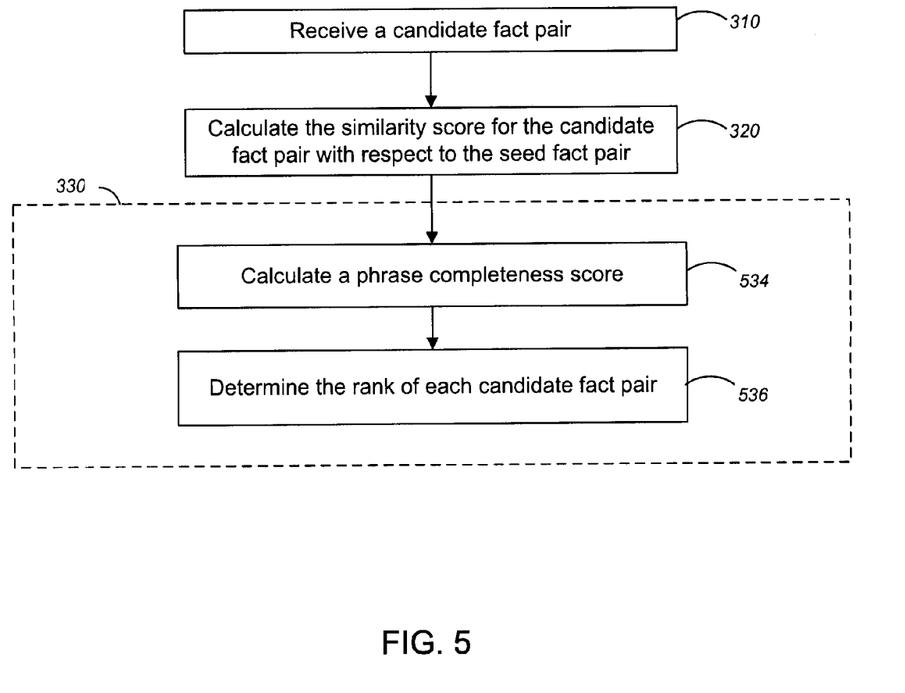
FIG. 5 is a flow chart of an illustrative method of ranking a candidate fact.

FIG. 5 is a flow chart of an illustrative method of ranking a candidate fact.

As described above, the system receives (step 310) a candidate fact and uses the set of seed facts to calculate (320) a similarity score.

The similarity scores are one of many features that can be used to compute a ranking (step 330) for each candidate fact. Additional features can be used to contribute to a final candidate fact ranking which is used to filter candidate facts. For example, the final candidate fact rank can include a phrase completeness score and the previously computed similarity score (step 320). The features can be used as linear terms in computing the final ranking score.

The features can also be weighted. In some implementations, the weights of different features are different. The features can also be weighted so that each weight is the same.

The system can also calculate (step 534) a phrase completeness score that is computed statistically over the entire set of candidate fact pairs. The phrase completeness score demotes candidate facts if any of their phrases is likely to be incomplete. For example, the incomplete phrase "Mary Lou" or "John F." are seen as likely incomplete when compared to their complete phrases "Mary Lou Retton" or "John F. Kennedy", respectively.

To compute a phrase completeness score, all phrases from the set of candidate facts are scanned in a first pass. The first pass counts the number of times that each word from any of the phrases appears in the first position of a phrase. The first pass also counts the number of occurrences that each word appears in the last position of a phrase.

At the end of this first pass, the system has two counts for each word in any of the phrases. For example, consider the candidate facts (Maria Smith, 1971), (John Benjamin Smith, 1977), (Terrence Gonzales, 1921), and (Gonzales La Vega, 1853). The counts for these facts would be, for Gonzales: 1 and 1, for Smith: 0 and 2, and for Maria: 1 and 0.

In a second pass over the set of candidate facts, the completeness score is computed for each candidate fact based on the first-position and last-position counts of its words using a ratio. The ratio measures if a phrase's first word appears frequently in the first position of other phrases, but not in the last position of other phrases. Similarly, the ratio also measures if a phrase's last word appears frequently in the last position of other phrases, but not in the first position of the other phrases. Using the candidate facts from the previous example, the ratio for the phrase Smith would be the highest, followed by Maria, and Gonzales would be the lowest. Intuitively, phrases that start with a first name are more likely to be person names than phrases that start with a last name, for example. Similarly, it is better to have a last name at the end of the phrase, rather than something that looks like a first name, for example.

The system determines (536) a final rank of each candidate fact by combining the phrase completeness score and the fact's similarity score. A fact's ranking score is defined as the feature scores taken to some weighted power and then multiplied together, or:

$$\text{Score(fact)} = \prod_i (\text{Score}_i(\text{fact}))^{w_i}$$

where the $\text{Score}_i$ (fact) are the scores of the individual scoring features (e.g., phrase completeness or similarity score). In one implementation, $w_i$ is 2.0 for the phrase completeness score and 3.0 for the similarity score.

If the final rank of the candidate fact exceeds a predetermined threshold value, the candidate fact is added to the set of facts and is used to extract additional patterns and candidate facts. As described above, the threshold value is defined as a percentile rank.

The system can optionally include other factors in determining a final rank of each candidate fact. For example, when used in conjunction with a corpus of documents that have quality scores associated with them, the system can use any available quality score for a document to rank candidate facts that are extracted from the document.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results.

What is claimed is:

1. A method, implemented by a computing system, for deriving facts, comprising:
   obtaining data identifying a set of seed fact pairs, wherein each seed fact pair associates a fact subject phrase with an information phrase;
   determining that a first sentence matches a first seed fact pair in the set of seed fact pairs, wherein determining that the first sentence matches the first seed fact pair comprises determining that the fact subject phrase and the information phrase from the first seed fact pair both occur in the first sentence separated by one or more terms;
   extracting, by the system, from the first sentence, a basic infix-only pattern that includes the one or more terms that separate the fact subject phrase from the information phrase in the first sentence;
   generating, by the system, a generalized infix-only extraction pattern from the basic infix-only pattern, wherein generating the generalized infix-only extraction pattern from the basic infix-only pattern comprises:
      determining that a first term of the one or more terms that separate the fact subject phrase from the information phrase in the first sentence belongs to a first distributionally similar class, and
      substituting the first distributionally similar class for the first term in the basic infix-only pattern;
   determining that a second sentence matches the generalized infix-only pattern, comprising determining that the second sentence includes a term that belongs to the first distributionally similar class; and
   applying, by the system, the generalized infix-only pattern to the second sentence to extract a candidate fact pair from the second sentence.

2. The method of claim 1, wherein:
the basic infix-only pattern is an infix phrase that includes all sentence terms in the first sentence between an occurrence of the fact subject phrase and an occurrence of the information phrase in the first sentence.

3. The method of claim 1, further comprising:
tagging each word in the fact subject phrase and the information phrase from the first seed fact pair with a respective part-of-speech tag;
generating a first sequence of part-of-speech tags for the fact subject phrase of the first seed fact pair and a second sequence of part-of-speech tags for the information phrase of the first seed fact pair, wherein applying the generalized infix-only pattern to the second sentence to extract the candidate fact pair comprises:
beginning with a word adjacent to a first end of the infix-only pattern and proceeding away from the pattern in the second sentence, adding a word from the second sentence to a first phrase for each tag in the second sequence, the first phrase being the portion of the second sentence between the last word added and the pattern, each word added to the phrase having a part of speech that matches the part of speech of the corresponding tag in the first sequence; and
beginning with a word adjacent to a second end of the infix-only pattern and proceeding away from the pattern in the second sentence, adding a word from the second sentence to a second phrase for each tag in the second sequence, the second phrase being the portion of the second sentence between the last word added and the pattern, each word added to the phrase having a part of speech that matches the part of speech of the corresponding tag in the second sequence;
wherein the candidate fact pair comprises the first phrase and the second phrase.

4. A method implemented by a computing system, the method comprising:
   receiving, by the system, one or more seed fact pairs, each seed fact pair associating a seed fact first phrase with a seed fact second phrase, wherein the seed fact first phrase is a seed fact subject and the seed fact second phrase is a piece of information;
   receiving, by the system, a set of one or more candidate fact pairs, each candidate fact pair associating a candidate fact first phrase and a candidate fact second phrase, wherein the candidate fact first phrase is a candidate fact subject and the candidate fact second phrase is a piece of information;

receiving similarity score data, wherein the similarity score data identifies, for each of a plurality of pairs of distributionally similar words, a respective similarity score between the distributionally similar words in the pair that defines how similar the distributionally similar words in the pair are; and calculating, by the system, a similarity score for each candidate fact pair with respect to at least one seed fact pair, wherein the similarity scores represent measures of similarity between respective ones of the candidate fact pairs and the at least one seed fact pair, and wherein calculating the similarity score for each candidate fact pair comprises:

determining a respective first similarity score for each word in the candidate fact first phrase that represents the similarity of the word to words from the seed fact first phrases from the at least one seed fact using the similarity score data, determining a respective second similarity score for each word in the candidate fact second phrase that represents the similarity of the word to words from the seed fact second phrases from the at least one seed fact using the similarity score data, and computing the similarity score for the candidate fact pair by combining the first and second similarity scores.

5. The method of claim 4, further comprising ranking, by the system, each candidate fact pair based on calculated similarity scores for each candidate fact pair.

6. The method of claim 4, wherein:
the candidate fact pairs include pairs derived from documents having respective associated document quality scores; and
the method further comprises using the respective associated document quality scores to calculate a rank score for each candidate fact pair.

7. The method of claim 6, wherein the method further comprises adding, by the system, all candidate fact pairs having a rank score above a threshold rank score to the set of seed fact pairs.

8. The method of claim 4, further comprising increasing, by the system, the similarity score for a candidate fact pair if the candidate fact pair is similar to more than one seed fact pair, a candidate fact pair being similar to a seed fact pair if the similarity score for the candidate fact pair with respect to the seed fact pair exceeds a threshold score.

9. A method performed by a computing system, the method comprising:

receiving similarity score data, wherein the similarity score data identifies, for each of a plurality of pairs of distributionally similar words, a respective similarity score between the distributionally similar words in the pair that defines how similar the distributionally similar words in the pair are;

calculating, by the system, a similarity score for one or more fact pairs in a first set with respect to each of one or more fact pairs in a second set, each fact pair associating a fact subject and an information phrase, wherein the similarity scores represent measures of similarity between both respective ones of the fact subjects of the one or more fact pairs in the first set and respective ones of the fact subjects of the one or more fact pairs in the second set and between respective ones of the information phrases of the one or more fact pairs in the first set and respective ones of the information phrases of the one or more fact pairs in the second set, wherein calculating the similarity score for a fact pair in the first set comprises:

determining a respective first similarity score for each word in the fact subject phrase of the fact pair that represents the similarity of the word to words from the fact subject phrases from the one or more fact pairs in the second set using the similarity score data, determining a respective second similarity score for each word in the information phrase of the fact pair that represents the similarity of the word to words from the information phrases from the one or more fact pairs in the second set using the similarity score data, and computing the similarity score for the fact pair by combining the first and second similarity scores; and ranking, by the system, the fact pairs in the first set according to their similarity scores.

10. The method of claim 9, further comprising:
adding, by the system, fact pairs in the first set having a ranking above a threshold to the second set to produce an updated second set;
obtaining additional fact pairs;
calculating, by the system, a similarity score for the additional fact pairs with respect to each of one or more fact pairs in the updated second set; and
ranking, by the system, the additional fact pairs according to their similarity scores.

11. Apparatus comprising:
a computer program product tangibly encoded on computer-readable data storage media and operable to cause data processing apparatus to perform operations, the operations comprising:
obtaining data identifying a set of seed fact pairs, wherein each seed fact pair associates a fact subject phrase with an information phrase;
determining that a first sentence matches a first seed fact pair in the set of seed fact pairs, wherein determining that the first sentence matches the first seed fact pair comprises determining that the fact subject phrase and the information phrase from the first seed fact pair both occur in the first sentence separated by one or more terms;
extracting, from the first sentence, a basic infix-only pattern that includes the one or more terms that separate the fact subject phrase from the information phrase in the first sentence;
generating a generalized infix-only extraction pattern from the basic infix-only pattern, wherein generating the generalized infix-only extraction pattern from the basic infix-only pattern comprises:
determining that a first term of the one or more terms that separate the fact subject phrase from the information phrase in the first sentence belongs to a first distributionally similar class, and
substituting the first distributionally similar class for the first term in the basic infix-only pattern;
determining that a second sentence matches the generalized infix-only pattern, comprising determining that the second sentence includes a term that belongs to the first distributionally similar class; and
applying the generalized infix-only pattern to the second sentence to extract a candidate fact pair from the second sentence.

12. The apparatus of claim 11, wherein:
the basic infix-only pattern is an infix phrase that includes all sentence terms in the first sentence between an occurrence of the fact subject phrase and an occurrence of the information phrase in the first sentence.

13. The apparatus of claim 11, the operations further comprising:
- tagging each word in the fact subject phrase and the information phrase from the first seed fact pair with a respective part-of-speech tag;
- generating a first sequence of part-of-speech tags for the fact subject phrase of the first seed fact pair and a second sequence of part-of-speech tags for the information phrase of the first seed fact pair, wherein applying the generalized infix-only pattern to the second sentence to extract the candidate fact pair comprises:
- beginning with a word adjacent to a first end of the infix-only pattern and proceeding away from the pattern in the second sentence, adding a word from the second sentence to a first phrase for each tag in the second sequence, the first phrase being the portion of the second sentence between the last word added and the pattern, each word added to the phrase having a part of speech that matches the part of speech of the corresponding tag in the first sequence; and
- beginning with a word adjacent to a second end of the infix-only pattern and proceeding away from the pattern in the second sentence, adding a word from the second sentence to a second phrase for each tag in the second sequence, the second phrase being the portion of the second sentence between the last word added and the pattern, each word added to the phrase having a part of speech that matches the part of speech of the corresponding tag in the second sequence;
- wherein the candidate fact pair comprises the first phrase and the second phrase.

14. A system comprising one or more computers and one or more storage devices storing instructions that when executed by the one or more computers cause the one or more computers to perform operations comprising:
- obtaining data identifying a set of seed fact pairs, wherein each seed fact pair associates a fact subject phrase with an information phrase;
- determining that a first sentence matches a first seed fact pair in the set of seed fact pairs, wherein determining that the first sentence matches the first seed fact pair comprises determining that the fact subject phrase and the information phrase from the first seed pair fact both occur in the first sentence separated by one or more terms;
- extracting, from the first sentence a basic infix-only pattern that includes the one or more terms that separate the fact subject phrase from the information phrase in the first sentence;
- generating a generalized infix-only extraction pattern from the basic infix-only pattern, wherein generating the generalized infix-only extraction pattern from the basic infix-only pattern comprises:
  - determining that a first term of the one or more terms that separate the fact subject phrase from the information phrase in the first sentence belongs to a first distributionally similar class, and
  - substituting the first distributionally similar class for the first term in the basic infix-only pattern;
- determining that a second sentence matches the generalized infix-only pattern, comprising determining that the second sentence includes a term that belongs to the first distributionally similar class; and
- applying the generalized infix-only pattern to the second sentence to extract a candidate fact pair from the second sentence.

15. The system of claim 14, wherein:
- the basic infix-only pattern is an infix phrase that includes all sentence terms in the first sentence between an occurrence of the fact subject phrase and an occurrence of the information phrase in the first sentence.

16. The system of claim 14, the operations further comprising:
- tagging each word in the fact subject phrase and the information phrase from the first seed fact pair with a respective part-of-speech tag;
- generating a first sequence of part-of-speech tags for the fact subject phrase of the first seed fact pair and a second sequence of part-of-speech tags for the information phrase of the first seed fact pair, wherein applying the generalized infix-only pattern to the second sentence to extract the candidate fact pair comprises:
- beginning with a word adjacent to a first end of the infix-only pattern and proceeding away from the pattern in the second sentence, adding a word from the second sentence to a first phrase for each tag in the second sequence, the first phrase being the portion of the second sentence between the last word added and the pattern, each word added to the phrase having a part of speech that matches the part of speech of the corresponding tag in the first sequence; and
- beginning with a word adjacent to a second end of the infix-only pattern and proceeding away from the pattern in the second sentence, adding a word from the second sentence to a second phrase for each tag in the second sequence, the second phrase being the portion of the second sentence between the last word added and the pattern, each word added to the phrase having a part of speech that matches the part of speech of the corresponding tag in the second sequence;
- wherein the candidate fact pair comprises the first phrase and the second phrase.

17. A system comprising one or more computers and one or more storage devices storing instructions that when executed by the one or more computers cause the one or more computers to perform operations comprising:
- receiving one or more seed fact pairs, each seed fact pair associating a seed fact first phrase and a seed fact second phrase, wherein the seed fact first phrase is a seed fact subject and the seed fact second phrase is a piece of information;
- receiving a set of one or more candidate fact pairs, each candidate fact pair associating a candidate fact first phrase and a candidate fact second phrase, wherein the candidate fact first phrase is a candidate fact subject and the candidate fact second phrase is a piece of information;
- receiving similarity score data, wherein the similarity score data identifies, for each of a plurality of pairs of distributionally similar words, a respective similarity score between the distributionally similar words in the pair that defines how similar the distributionally similar words in the pair are; and
- calculating a similarity score for each candidate fact pair with respect to at least one seed fact pair, wherein the similarity scores represent measures of similarity between respective ones of the candidate fact pairs and the at least one seed fact pair, and wherein calculating the similarity score for each candidate fact pair comprises:
  - determining a respective first similarity score for each word in the candidate fact first phrase that represents the similarity of the word to words from the seed fact first phrases from the at least one seed fact using the similarity score data, determining a respective second similarity score for each word in the candidate fact second phrase that represents the similarity of the word to words from the seed fact second phrases from the at least one seed fact using the similarity score data, and computing the similarity score for the candidate fact pair by combining the first and second similarity scores.

18. The system of claim 17, the operations further comprising ranking each candidate fact pair based on calculated similarity scores for each candidate fact pair.

19. The system of claim 17, wherein:

the candidate fact pairs include pairs derived from documents having respective associated document quality scores; and the method further comprises using the respective associated document quality scores to calculate a rank score for each candidate fact pair.

20. The system of claim 19, the operations further comprising adding candidate fact pairs having a rank score above a threshold rank score to the set of seed fact pairs.

21. The system of claim 17, the operations further comprising increasing the similarity score for a candidate fact pair if the candidate fact pair is similar to more than one seed fact pair, a candidate fact pair being similar to a seed fact pair if the similarity score for the candidate fact pair with respect to the seed fact pair exceeds a threshold score.

22. A system comprising one or more computers and one or more storage devices storing instructions that when executed by the one or more computers cause the one or more computers to perform operations comprising:

receiving similarity score data, wherein the similarity score data identifies, for each of a plurality of pairs of distributionally similar words, a respective similarity score between the distributionally similar words in the pair that defines how similar the distributionally similar words in the pair are;

calculating, by the system, a similarity score for one or more fact pairs in a first set with respect to each of one or more fact pairs in a second set, each fact pair associating a fact subject and an information phrase, wherein the similarity scores represent measures of similarity between both respective ones of the fact subjects of the one or more fact pairs in the first set and respective ones of the fact subjects of the one or more fact pairs in the second set and between respective ones of the information phrases of the one or more fact pairs in the first set and respective ones of the information phrases of the one or more fact pairs in the second set, wherein calculating the similarity score for a fact pair in the first set comprises:

determining a respective first similarity score for each word in the fact subject phrase of the fact pair that represents the similarity of the word to words from the fact subject phrases from the one or more fact pairs in the second set using the similarity score data, determining a respective second similarity score for each word in the information phrase of the fact pair that represents the similarity of the word to words from the information phrases from the one or more fact pairs in the second set using the similarity score data, and computing the similarity score for the fact pair by combining the first and second similarity scores; and ranking, by the system, the fact pairs in the first set according to their similarity scores.

23. The system of claim 22, the operations further comprising:

adding fact pairs in the first set having a ranking above a threshold to the second set to produce an updated second set;

obtaining additional fact pairs;

calculating a similarity score for the additional fact pairs with respect to each of one or more fact pairs in the updated second set; and ranking the additional fact pairs according to their similarity scores.

* * * * *